(12) United States Patent
Drazic et al.

(10) Patent No.: US 12,210,155 B2
(45) Date of Patent: Jan. 28, 2025

(54) OPTICAL DEVICE COMPRISING A MULTI-LAYERS WAVEGUIDES

(71) Applicant: InterDigital CE Patent Holdings, Paris (FR)

(72) Inventors: Valter Drazic, Betton (FR); Oksana Shramkova, Cesson-Sévigné (FR); Arno Schubert, Chevaigné (FR)

(73) Assignee: InterDigital CE Patent Holdings, Paris (FR)

( * ) Notice: Subject to any disclaimer, the term of this patent is extended or adjusted under 35 U.S.C. 154(b) by 802 days.

(21) Appl. No.: 17/256,159

(22) PCT Filed: May 28, 2019

(86) PCT No.: PCT/EP2019/063802
§ 371 (c)(1),
(2) Date: Dec. 24, 2020

(87) PCT Pub. No.: WO2020/001899
PCT Pub. Date: Jan. 2, 2020

(65) Prior Publication Data
US 2021/0271085 A1   Sep. 2, 2021

(30) Foreign Application Priority Data

Jun. 29, 2018   (EP) .................................. 18305834

(51) Int. Cl.
*G02B 27/01*   (2006.01)
*F21V 8/00*   (2006.01)
(Continued)

(52) U.S. Cl.
CPC ....... *G02B 27/0172* (2013.01); *G02B 5/1842* (2013.01); *G02B 5/1866* (2013.01);
(Continued)

(58) Field of Classification Search
CPC .............. G02B 27/0127; G02B 5/1842; G02B 5/17866; G02B 5/3083
See application file for complete search history.

(56) References Cited

U.S. PATENT DOCUMENTS 3,718,383 A   2/1973   Moore
6,099,146 A   8/2000   Imamura
(Continued)

FOREIGN PATENT DOCUMENTS

CN   1319191 A   10/2001
CN   1502050 A   6/2004
(Continued)

OTHER PUBLICATIONS

Gennarelli, G.et al., "A uniform asymptotic solution for the diffraction by a right-angled dielectric wedge" IEEE transactions on antennas and propagation, vol. 59 No. 3, Mar. 2011 pp. 898-903 (6 pages).

(Continued)

*Primary Examiner* — Jerry L Brooks
(74) *Attorney, Agent, or Firm* — Klintworth & Rozenblat IP LLP

(57) ABSTRACT

It is proposed an optical device for delivering a polychromatic image to an eye box being an area positioned in front of an eye of a user wearing said optical device. The optical device is remarkable in that it comprises: • a light-engine for delivering said polychromatic image, said light engine being able to generate n different monochromatic light image beams $[C_1, \ldots, C_i, \ldots, C_n]$, whom combination corresponds to said polychromatic image, each monochromatic light image $C_j$ being associated with a wavelength $\lambda_j$, and wherein $\lambda_{i+1} > \lambda_i$ for all the $i \in [1, n]$, and wherein the monochromatic light image beams $C_j$ is in a transverse (Continued)

electric mode if j is odd, and the monochromatic light image beams $C_j$ is in a transverse magnetic mode if j is even; • n-waveguide elements (502, 503, 504) that are stack on each other, n being an integer greater or equal to three, each waveguide element, except the one closer to the eye of a user, comprising a diffraction grating that can deviate only one of said n monochromatic light image in the waveguide element by total internal reflection, a first output that delivers deviated light toward said eye box, and a second output that delivers non-deviated light by a waveguide element to a subsequent waveguide element, wherein said second output comprising an achromatic half-wave plate (506, 507), and wherein the waveguide element that is closer to the eye of the user comprises also a diffraction grating that can deviate only one of said n monochromatic light image in the waveguide element by total internal reflection, and an output that delivers deviated light toward said eye box, wherein each diffraction grating of said optical device is associated with a different wavelength, and, wherein the arrangement order of said n-waveguide is done according to the wavelength value, from the smallest to the highest, the smallest waveguide element being positioned closer to the light engine.

17 Claims, 5 Drawing Sheets

(51) Int. Cl.
  *G02B 5/18* (2006.01)
  *G02B 5/30* (2006.01)
  *G02B 27/28* (2006.01)
(52) U.S. Cl.
  CPC ......... *G02B 5/3083* (2013.01); *G02B 6/0026* (2013.01); *G02B 6/0056* (2013.01); *G02B 6/0076* (2013.01); *G02B 27/286* (2013.01); *G02B 2027/0112* (2013.01)

(56) References Cited

U.S. PATENT DOCUMENTS

| | | | |
|---|---|---|---|
| 6,721,485 B1 | 4/2004 | Nakamura | |
| 6,891,147 B2 | 5/2005 | Goto | |
| 7,142,363 B2 | 11/2006 | Sato | |
| 7,394,535 B1 | 7/2008 | Chen | |
| 7,738,346 B2 | 6/2010 | Ooi | |
| 8,885,997 B2 | 11/2014 | Nguyen | |
| 9,099,370 B2 | 8/2015 | Nishiwaki | |
| 9,140,602 B2 | 9/2015 | Narasimhan | |
| 9,297,939 B2 | 3/2016 | Palanchoke | |
| 9,383,582 B2 | 7/2016 | Tang et al. | |
| 9,419,036 B2 | 8/2016 | Saitou | |
| 9,564,469 B2 | 2/2017 | Kim | |
| 9,766,467 B2 | 9/2017 | Sohn | |
| 9,827,209 B2 | 11/2017 | Kostamo | |
| 9,880,393 B2 | 1/2018 | Kim | |
| 9,891,436 B2 | 2/2018 | Wall | |
| 10,534,115 B1 | 1/2020 | Calafiore | |
| 10,866,360 B2 | 12/2020 | Khorasaninejad | |
| 11,163,175 B2 | 11/2021 | Boriskin | |
| 11,204,452 B2 | 12/2021 | Paniagua Dominguez | |
| 11,275,252 B2 | 3/2022 | Boriskin | |
| 11,396,474 B2 | 7/2022 | Drazic | |
| 11,573,356 B2 | 2/2023 | Shramkova | |
| 11,604,363 B2 | 3/2023 | Damghanian | |
| 2004/0198582 A1 | 10/2004 | Borrelli | |
| 2005/0002611 A1 | 1/2005 | Levola | |
| 2006/0124833 A1 | 6/2006 | Toda | |
| 2006/0250933 A1 | 11/2006 | Asada | |
| 2009/0190094 A1 | 7/2009 | Watanabe | |
| 2009/0205090 A1 | 8/2009 | Mimouni | |
| 2010/0091376 A1 | 4/2010 | Sano | |
| 2010/0134890 A1 | 6/2010 | Chen | |
| 2010/0188537 A1 | 7/2010 | Hiramoto | |
| 2011/0043918 A1 | 2/2011 | Crouse | |
| 2011/0235166 A1 | 9/2011 | Zhu | |
| 2012/0147373 A1 | 6/2012 | Kamimura | |
| 2013/0099343 A1 | 4/2013 | Toshikiyo | |
| 2013/0099434 A1 | 4/2013 | Yano | |
| 2013/0250421 A1 | 9/2013 | Wakabayashi | |
| 2013/0322810 A1 | 12/2013 | Robbins | |
| 2014/0192409 A1 | 7/2014 | Yamaguchi | |
| 2015/0063753 A1 | 3/2015 | Evans | |
| 2015/0219842 A1 | 8/2015 | Sqalli | |
| 2015/0286060 A1 | 10/2015 | Roh | |
| 2015/0301333 A1 | 10/2015 | Levesque | |
| 2015/0323800 A1 | 11/2015 | Nam | |
| 2015/0362641 A1 | 12/2015 | Boyraz | |
| 2015/0362841 A1 | 12/2015 | Zelsacher | |
| 2016/0033697 A1 | 2/2016 | Sainiemi | |
| 2016/0047951 A1 | 2/2016 | Eckstein | |
| 2016/0054172 A1 | 2/2016 | Roh | |
| 2016/0064172 A1 | 3/2016 | Kirbawy | |
| 2016/0064448 A1 | 3/2016 | Shin | |
| 2016/0070062 A1 | 3/2016 | Lipson | |
| 2016/0172390 A1 | 6/2016 | Numata | |
| 2016/0231568 A1 | 8/2016 | Saarikko | |
| 2016/0274281 A1 | 9/2016 | Lutolf | |
| 2017/0006278 A1 | 1/2017 | Vandame | |
| 2017/0012078 A1 | 1/2017 | Han | |
| 2017/0090206 A1 | 3/2017 | Kim | |
| 2017/0092668 A1 | 3/2017 | Kim | |
| 2017/0092676 A1 | 3/2017 | Yun | |
| 2017/0097510 A1 | 4/2017 | Sohn | |
| 2017/0098672 A1 | 4/2017 | Yun | |
| 2017/0179178 A1 | 6/2017 | Park | |
| 2017/0201658 A1 | 7/2017 | Rosenblatt | |
| 2017/0212348 A1* | 7/2017 | Fu | G02B 6/02052 |
| 2017/0307886 A1 | 10/2017 | Stenberg | |
| 2017/0315346 A1 | 11/2017 | Tervo | |
| 2017/0351111 A1 | 12/2017 | Jeong | |
| 2018/0113313 A1 | 4/2018 | Tekolste | |
| 2018/0231771 A1 | 8/2018 | Schuck, III | |
| 2018/0252850 A1 | 9/2018 | Aoki | |
| 2018/0259691 A1 | 9/2018 | Wang | |
| 2018/0354844 A1 | 12/2018 | Drazic | |
| 2019/0101700 A1 | 4/2019 | Boriskin | |
| 2019/0121239 A1 | 4/2019 | Singh | |
| 2019/0243233 A1 | 8/2019 | Boriskin | |
| 2019/0257986 A1 | 8/2019 | Paniagua Dominguez | |
| 2020/0066811 A1 | 2/2020 | Cha | |
| 2020/0233223 A1 | 7/2020 | Shramkova | |
| 2020/0348526 A1 | 11/2020 | Boriskin | |
| 2021/0041609 A1 | 2/2021 | Shramkova | |
| 2021/0041709 A1 | 2/2021 | Damghanian | |
| 2021/0088802 A1 | 3/2021 | Murakami | |
| 2021/0233291 A1 | 7/2021 | Shramkova | |
| 2022/0059250 A1 | 2/2022 | Shramkova | |

FOREIGN PATENT DOCUMENTS

| | | |
|---|---|---|
| CN | 1606704 A | 4/2005 |
| CN | 1661478 A | 8/2005 |
| CN | 1693928 A | 11/2005 |
| CN | 1756972 A | 4/2006 |
| CN | 1762009 A | 4/2006 |
| CN | 1898584 A | 1/2007 |
| CN | 101114031 A | 1/2008 |
| CN | 101114032 A | 1/2008 |
| CN | 101241202 A | 8/2008 |
| CN | 101263378 A | 9/2008 |
| CN | 101359094 A | 2/2009 |
| CN | 101467021 A | 6/2009 |
| CN | 101611333 A | 12/2009 |
| CN | 101688929 A | 3/2010 |
| CN | 102498374 A | 6/2012 |
| CN | 101799589 B | 5/2013 |
| CN | 103119498 A | 5/2013 |
| CN | 104718479 A | 6/2015 |

(56) References Cited

FOREIGN PATENT DOCUMENTS

| | | |
|---|---|---|
| CN | 105074511 A | 11/2015 |
| CN | 105765421 A | 7/2016 |
| CN | 106331445 A | 1/2017 |
| CN | 106772734 A | 5/2017 |
| CN | 106932845 A | 7/2017 |
| CN | 107462983 A | 12/2017 |
| CN | 108508506 A | 9/2018 |
| CN | 108885354 A | 11/2018 |
| CN | 108919399 A | 11/2018 |
| CN | 109073885 A | 12/2018 |
| CN | 109891318 A | 6/2019 |
| EP | 1406098 A1 | 4/2004 |
| EP | 1542043 A1 | 6/2005 |
| EP | 1904827 A2 | 4/2008 |
| EP | 2196729 | 6/2010 |
| EP | 2229938 | 9/2010 |
| EP | 2955753 | 12/2015 |
| EP | 3223062 A1 | 9/2017 |
| EP | 3223063 A1 | 9/2017 |
| EP | 3240046 A1 | 11/2017 |
| EP | 3312646 A1 | 4/2018 |
| EP | 3312660 A1 | 4/2018 |
| EP | 3312674 A1 | 4/2018 |
| EP | 3339938 A1 | 6/2018 |
| EP | 3385219 A1 | 10/2018 |
| EP | 3499278 | 6/2019 |
| EP | 3540479 A1 | 9/2019 |
| EP | 3540499 | 9/2019 |
| EP | 3540499 A1 | 9/2019 |
| EP | 3588150 | 1/2020 |
| EP | 3591700 A1 | 1/2020 |
| EP | 3671293 | 6/2020 |
| EP | 3671322 A1 | 6/2020 |
| GB | 2529003 | 2/2016 |
| JP | 2003005129 A | 1/2003 |
| JP | 2014134564 | 7/2014 |
| JP | 2016500160 A | 1/2016 |
| JP | 2017063198 A | 3/2017 |
| TW | 200502570 A | 1/2005 |
| TW | 201042286 A | 12/2010 |
| WO | 03007032 A1 | 1/2003 |
| WO | 2003025635 A1 | 3/2003 |
| WO | 2004094326 A3 | 5/2005 |
| WO | 2007031991 A2 | 3/2007 |
| WO | 2009083977 A2 | 7/2009 |
| WO | 2014036537 A1 | 3/2014 |
| WO | 2014044912 | 3/2014 |
| WO | 2017116637 | 7/2017 |
| WO | 2017116637 A1 | 7/2017 |
| WO | 2017131983 | 8/2017 |
| WO | 2017162880 A1 | 9/2017 |
| WO | 2017162882 A1 | 9/2017 |
| WO | 2017180403 | 10/2017 |
| WO | 2017180403 A1 | 10/2017 |
| WO | 2018052750 A1 | 3/2018 |
| WO | 2018102582 | 6/2018 |
| WO | 2018102582 A1 | 6/2018 |
| WO | 2018102834 A2 | 6/2018 |
| WO | 2020128030 A1 | 6/2020 |
| WO | 2021053182 | 3/2021 |

OTHER PUBLICATIONS

Wang, P. et al., "Ultra-high-sensitivity color imaging via a transparent diffractive-filter array and computational optics: supplementary material." Optica, Oct. 2015 (9 pages).
Fontaine, R. "The state-of-the-art of mainstream CMOS image sensors." In Proceedings of the International Image Sensors Workshop, 2015 (4 pages).
Wang, P. et al., "Computational single-shot hyper-spectral imaging based on a microstructured diffractive optic." In 2016 Conference on Lasers and Electro-Optics (CLEO), IEEE, 2016 (2 pages).
Palanchoke, U. et al., "Spectral sorting of visible light using dielectric gratings." Optics Express 25, No. 26, Dec. 2017 pp. 33389-33399 (11 pages).
Rakovich, Y. P. et al., "Photonic Nanojets in Coupled Microcavities." In The European Conference on Lasers and Electro-Optics, p. JSV2_3. Optical Society of America, 2009 (1 page).
Yang, J. et al., "Polychromatic see-through near-eye display design with two waveguides and a large field-of-view." In Optics, Photonics and Digital Technologies for Imaging Applications IV, vol. 9896, p. 989605. International Society for Optics and Photonics, 2016 (7 pages).
International Preliminary Report on Patentability for PCT/EP2019/084526 issued on Jun. 16, 2021, 11 pages.
Liu, Cheng-Yang, "Photonic Jets Produced by Dielectric Micro Cuboids". Applied Optics, vol. 54, Issue 29, (2015), pp.8694-8699.
Varghese, B. et al., "Influence of an edge height on the diffracted EM field distribution." In 2019 21st International Conference on Transparent Optical Networks (ICTON), pp. 1-4. IEEE, 2019.
Shramkova, O. et al "Photonic nanojet generated by dielectric multi-material microstructure" META Jul. 2019, (2 pages).
Neves, A. A. R., "Photonic nanojets in optical tweezers." Journal of Quantitative Spectroscopy and Radiative Transfer 162, Mar. 17, 2015 (20 pages).
Eisen, L., et al., "Total internal reflection diffraction grating in conical mounting." Optics communications 261, No. 1, 2006, pp. 13-18 (6 pages).
Levola, T., "Diffractive optics for virtual reality displays." Journal of the Society for Information Display 14, No. 5, 2006 pp. 467-475 (9 pages).
Zhang, Li, et al., "CE4-related: History-based Motion Vector Prediction", Joint Video Experts Team (JVET) of ITU-T SG 16 WP 3 and ISO/IEC JTC 1/SC 29/WG 11, Document: JVET-K0104-v5, 11th Meeting: Ljubljana, SI, Jul. 10-18, 2018 (7 pages).
Tao, Z. et al., "Design of polarization-dependent color filters based on all-dielectric metasurfaces for dynamic modulation of color HSV", 11th International Congress on Engineered Materials Platforms for Novel Wave Phenomena (Metamaterials), 2017, 3 pages.
Lotti, F. et al., "Nanoparticle-based metasurfaces for angular-independent spectral filtering applications", 2017 Conference on Lasers and Electro-Optics Europe & European Quantum Electronics Conference (CLEO/Europe-EQEC), 2017.
Mahani, F. F., et al., "Optimization of plasmonic color filters for CMOS image sensors by genetic algorithm", 2nd Conference on Swarm Intelligence and Evolutionary Computation (CSIEC), 2017, 4 pages.
Gordon, James P., "Radiation Forces and Momenta in Dielectric Media", Phys. Rev. A vol. 8, 14—Published Jul. 1, 1973, 8 pages. Available online at: http://totuvach.free.fr/Articles/gordon73.pdf.
Wang, Hoatian, et. al., "Trapping and manipulating nanoparticles in photonic nanojets", Optics Letters vol. 41 No. 7, Apr. 2016, 4 pages.
Cui, Xudong, et. al., "Optical forces on metallic nanoparticles induced by a photonic nanojet", Optics Express, vol. 16, Issue 18, Oct. 2008, pp. 13560-13568 (9 pages).
Zheng, Zhu, et. al., "Optical trapping with focused Airy beams", Applied Optics vol. 50, Issue 1, 2011, pp. 43-49 (7 pages).
Siviloglou, Georgios A., et. al., "Accelerating finite energy Airy beams", Apr. 15, 2007, vol. 32, No. 8, Optics Letters, pp. 979-981 (3 pages).
Čižmár, Thomas, et. al., "Optical conveyor belt for delivery of submicron objects" Applied Physics Letters, vol. 86, Issue 17, Apr. 25, 2005, 3 pages.
V. Garcés-Chávez, et. al., "Simultaneous micromanipulation in multiple planes using a self-reconstructing light beam", Nature vol. 419, Sep. 12, 2002, 145-147 (3 pages).
Bosanac, Lana, et. al., "Efficient Optical Trapping and Visualization of Silver Nanoparticles", Nano Letters 2008, vol. 8, No. 5, pp. 1486-1491 (6 pages).
Ashkin, A., et. al., "Observation of a single-beam gradient force optical trap for dielectric particles", Optics Letters vol. 11, Issue 5, May 1986 pp. 288-290 (3 pages).
Ahskin, A., et. al., "Optical trapping and manipulation of viruses and bacteria", Science, Mar. 1987, vol. 235, Issue 4795, pp. 1517-1520 (4 pages).

(56) References Cited

OTHER PUBLICATIONS

Block, Steven M., et al., "Bead movement by single kinesin molecules studied with optical tweezers", Nature, vol. 348, Nov. 1990 pp. 348-352 (5 pages).
Jones, P. H., et. al., "Trapping and manipulation of microscopic bubbles with a scanning optical tweezer", Applied Physics Letters, vol. 89, Issue 8, Aug. 21, 2006 (3 pages).
X. Tsampoula, et. al., "Femtosecond cellular transfection using a nondiffracting light beam", Applied Physics Letters, vol. 91, Issue 5, Jul. 30, 2007 (3 pages).
Siviloglou, Georgios A., et. al., "Observation of Accelerating Airy Beams", Physics Review Letters, vol. 99, Issue 21—Published Nov. 20, 2007 (4 pages).
Berry, M. V., et. al., "Nonspreading wave packets", American Journal of Physics, vol. 47, Iss. 3, Mar. 1979 (4 pages).
Yannopapas, Vassilios, "Photonic nanojets as three-dimensional optical atom traps: A theoretical study", Optics Communications, vol. 285, Issue 12, pp. 2952-2955, Jun. 1, 2012, 3 pages.
Zhang, Peng, et. al., "Trapping and guiding microparticles with morphing autofocusing Airy beams", Optics Letters, vol. 36, No. 15, Aug. 2011, pp. 2883-2885 (3 pages).
Liu, Yujie, et al., "Total internal reflection diffraction grating in conical mounting and its application in planar display", International Conference on Photonics and Optical Engineering (icPOE 2014), vol. 9449, pp. 9449-9449-6, 2015 (6 pages).
Zhanjun, Yan, et al., "Virtual display design using waveguide hologram in conical mounting configuration." Optical Engineering, Sep. 2011, 50:50-50-9 (8 pages).
J. R. DeVore, "Refractive Indices of Rutile and Sphalerite," J. Opt. Soc. Am. 41, pp. 416-419, 1951 (4 pages).
International Preliminary Report on Patentability for PCT/EP2019/063802 issued on Dec. 29, 2020, 8 pages.
Genevet, Patrice, et. al., "Recent Advances In Planar Optics: From Plasmonic To Dielectric Metasurfaces". Optica, vol. 4, No. 1, Jan. 2017, pp. 139-152.
Aieta, Francesco, et. al., "Multiwavelength Achromatic Metasurfaces By Dispersive Phase Compensation". Sciencexpress, 2015, (8 pages).
Khorasaninejad, Mohammadreza, et. al., "Achromatic Metasurface Lens At Telecommunication Wavelengths". Nano Letters, 2015, (5 pages).
Deng, Zi-Lan, et. al., "Wide-Angle And High-Efficiency Achromatic Metasurfaces For Visible Light". Optical Express, vol. 24, No. 20 pp. 23118-23128 (12 pages).
Avayu, Ori, et. al., "Composite Functional Metasurfaces For Multispectral Achromatic Optics". Nature Communications, 2017, pp. 1-7 (7 pages).
Nishiwaki, Seiji, et. al., "Efficient Colour Splitters for High-Pixel-Density Image Sensors". Nature Photonics, vol. 7, Mar. 2013, pp. 240-246.
International Search Report and Written Opinion of the International Searching Authority for PCT/EP2019/085489, mailed Jan. 30, 2020, 11 pages.
Yi, Jianjia, et. al., "Coherent Beam Control With An All-Dielectric Transformation Optics Based Lens". Scientific Reports, vol. 6, No. 1, Jan. 5, 2016, pp. 1-8.
Zhao, Yanhui, et. al., "Beam Bending Via Plasmonic Lenses". Optics Express, vol. 18, No. 22, Oct. 25, 2010, pp. 23458-23465.
Jun, Young Chul, et. al., "Optical Manipulation With Plasmonic Beam Shaping Antenna Structures". Advances in OptoElectronicsm, (2012).
Khorasaninejad, Mohammadreza, et. al., "Super-Dispersive Off-Axis Meta-Lenses For Compact High Resolution Spectroscopy". Nano Letters, vol. 16, No. 6, (2016), pp. 3732-3737.
Liu, Zhaowei, et. al., "Tuning The Focus Of A Plasmonic Lens By The Incident Angle". Applied Physics Letters, vol. 88, No. 17, (2006), pp. 171108-1-171108-2.
Chen, Yiguo, et. al., "Engineering The Phase Front Of Light With Phase-Change Material Based Planar Lenses". Scientific Reports vol. 5, No. 1, Mar. 2, 2015, pp. 1-7.

Kong, Soon-Cheol, et. al., "Photonic Nanojet-Enabled Optical Data Storage". Optical Society of America, Optics Express, vol. 16, No. 18, Sep. 1, 2008, pp. 13713-13719.
Pacheco-Peña, V., et. al., "Terajets Produced By Dielectric Cuboids". Applied Physics Letters 105, 084102, (2014), doi: 10.1063/1.4894243, 5 pages.
Pacheco-Peña, V., et. al., "Multifrequency Focusing And Wide Angular Scanning Of Terajets". Optical Society of America, Optics Letters, vol. 40, No. 2, (2015), 5 pages.
Itagi, A. V., et. al., , "Optics of Photonic Nanojets". Optical Society of America. J. Opt. Soc. Am. A , Vo.22, Dec. 2005 pp. 2847-2858 (12 pages).
Heifetz, Alexander, et. al., "Subdiffraction Optical Resolution Of A Gold Nanosphere Located Within The Nanojet Of A Mie-Resonant Dielectric Microsphere". Optical Express, vol. 15, No. 25, (2007), 17334-17342.
Devilez, Alexis, et. al., "Three-Dimensional Subwavelength Confinement Of Light With Dielectric Microspheres". Optics Express, vol. 17, No. 4, Feb. 16, 2009, pp. 2089-2094.
Shen, Yuecheng, et. al., "Ultralong Photonic Nanojet Formed By A Two-Layer Dielectric Microsphere". Optical Letters, Optical Society of America, vol. 39, No. 14, Jul. 15, 2014, 4120-4123.
Ruiz, César Mendez, et. al., "Detection Of Embedded Ultrasubwavelength-Thin Dielectric Features Using Elongated Photonic Nanojets". Optical Express, vol. 18, No. 16, Aug. 2, 2010, pp. 16805-16812.
Geints, Yuri E., et. al., "Photonic Nanojet Calculations In Layered Radially Inhomogeneous Micrometer-Sized Spherical Particles". Optical Society of America, vol. 28, No. 8, Aug. 2011, 1825-1830.
Gu, Guoqiang, et. al. "Super-Long Photonic Nanojet Generated from Liquid-Filled Hollow Microcylinder". Optical Society of America, Optical Letters, vol. 40, No. 4, Feb. 15, 2015, pp. 625-628.
Mao, Xiurun, et. al., "Tunable Photonic Nanojet Formed By Generalized Luneburg Lens". Optics Express, vol. 23, No. 20, (2015), pp. 26426-26433.
Geints, Yu, E., et. al., "Modeling Spatially Localized Photonic Nanojets From Phase Diffraction Gratings". Journal of Applied Physics, vol. 119, No. 15, Apr. 21, 2016, pp. 153101-1-153101-6.
International Search Report and Written Opinion of the International Searching Authority for PCT/EP2019/055679 mailed May 16, 2019, 10 pages.
International Preliminary Report on Patentability for PCT/EP19/055679 issued on Sep. 15, 2020, 6 pages.
Kotlyar, Victor, et. al., "Photonic Nanojets Generated Using Square-Profile Microsteps". Optical Society of America, Applied Optics, vol. 53, No. 24, Aug. 20, 2014, pp. 5322-5329.
International Search Report and Written Opinion of the International Searching Authority for PCT/EP2019/055905 mailed May 22, 2019, 12 pages.
International Preliminary Report on Patentability for PCT/EP2019/055905 issued on Sep. 15, 2020, 8 pages.
Xiao, Jiasheng, et. al., "Design Of Achromatic Surface Microstructure For Near-Eye Display With Diffractive Waveguide". Optics Communications, vol. 452, (2019), pp. 411-416.
International Search Report and Written Opinion of the International Searching Authority for PCT/EP2019/063802 mailed Sep. 16, 2019, 14 pages.
Ang, Angeleene S., et. al., "'Photonic Hook' Based Optomechanical Nanoparticle Manipulator". Scientific Reports, vol. 8. No. 2029, Published online: Feb. 1, 2018, pp. 1-7.
Chaumet, P. C., et. al., "Time-Averaged Total Force On A Dipolar Sphere In An Electromagnetic Field". Optics Letters, vol. 25, No. 15, (2000), pp. 1065-1067 (3 pages).
Xu, Chen, et. al., "Photon Nanojet Lens: Design, Fabrication and Characterization". Nanotechnology, vol. 27, No. 16, Mar. 4, 2016, pp. 1-6.
Yue, Liyang, et. al., "Photonic Hook: A New Curved Light Beam". Optics Letters, vol. 43, No. 4, Feb. 2018, pp. 771-774 (5 pages).
International Search Report and Written Opinion of the International Searching Authority PCT/EP2019/084526 mailed Mar. 10, 2020, 15 pages.
Boriskin, Artem, et. al., "Near Field Focusing By Edge Diffraction". Optics Letters, vol. 43, No. 16, Aug. 2018, pp. 4053-4056 (4 pages).

(56) References Cited

OTHER PUBLICATIONS

Shramkova, Oksana, et. al., "Localized Photonic Jets Generated By Step-Like Dielectric Microstructures". IEEE 20th International Conference on Transparent Optical Networks (ICTON), (2018), pp. 1-4. (4 pages).
Liu, Cheng-Yang, et. al., "Localized Photonic Nanojets Formed By Core-Shell Diffraction Gratings". Integrated Optics: Physics and Simulations III, International Society for Optics and Photonics, vol. 10242, (2017), p. 102420W (4 pages).
International Search Report and Written Opinion of the International Searching Authority for PCT/EP2019/063739 mailed Aug. 8, 2019, (11 pages).
International Preliminary Report on Patentability for PCT/EP2019/063739 issued on Jan. 5, 2021, (7 pages).
International Search Report and Written Opinion of the International Searching Authority for PCT/EP2019/086776 mailed Mar. 6, 2020, 13 pages.
International Search Report and Written Opinion for PCT/EP2021/057273 mailed Jun. 30, 2021 (15 pages).
International Preliminary Report on Patentability for PCT/EP2019/085489 issued Jun. 16, 2021, (8 pages).
International Preliminary Report on Patentability for PCT/EP2019/086776 issued Jun. 16, 2021, (9 pages).
Teranishi, N. et al.,"Evolution of optical structure in image sensors." In 2012 International Electron Devices Meeting, pp. 24-1. IEEE, 2012 (4 pages).
Nishiwaki, S. et al., "Highly Sensitive Image Sensors Using Micro Color Splitters." ITE Technical Report vol. 37 No. 47, Dec. 2014 (2 pages).
Chen, Q. et al., "Nanophotonic image sensors." Small 12, No. 36, 2016: 4922-4935 (14 pages).

\* cited by examiner

OPTICAL DEVICE COMPRISING A MULTI-LAYERS WAVEGUIDES

CROSS-REFERENCE TO RELATED APPLICATIONS

The present application is a national stage application under 35 U.S.C. 371 of International Application No. PCT/EP2019/063802, entitled "AN OPTICAL DEVICE COMPRISING A MULTI-LAYERS WAVEGUIDES", filed on May 28, 2019, which claims benefit from European Patent Application Serial No. 18305834.6, entitled "An Optical Device Comprising a Multi-Layers Waveguides", filed Jun. 29, 2018.

TECHNICAL FIELD

The disclosure relates to the field of augmented reality glasses. More precisely, it is related to the in-couplers which deviate the picture or image from a light engine into a waveguide where the pictures are transferred to the extraction zone by total internal reflection (TIR).

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Improvement of augmented reality glasses is an active research topic. Indeed, there are still ongoing researches for reducing the power consumption of these devices, for extending the field of views, for providing better quality of images, etc.

Examples of architectures and improvements of these devices are described in the following documents: U.S. Pat. No. 9,383,582, It should be noted that an augmented reality glasses usually comprises a light source or a light engine (as a white light source, such as a white LED illuminates a liquid crystal display (LCD) that displays an image to a user, or a technique as described in document WO 2018-102582).

In addition, these devices also comprise in-couplers or in-coupling elements (for example, see WO2017116637 or the article entitled "Design of achromatic surface microstructure for near-eye display with diffractive waveguide" by Jiasheng Xiao et al.), that are made of diffraction gratings and as such work for a limited range of wavelength. If a polychromatic picture is necessary for making a true color virtual image superimposed on the field of view then it is necessary to have as much waveguides as the number of color primaries used by the light engine.

Usually, a single diffraction grating is tailored to one wavelength. Hence, the design of a waveguiding system for true color image is important for these kinds of devices.

In document U.S. Pat. No. 8,885,997, it has been proposed a technique for using several waveguides for delivering a polychromatic image or picture. More precisely, FIG. 32 of document U.S. Pat. No. 8,885,997 shows schematics and the principle for two wavelengths. When green light hits the first diffraction grating with a TE (Transverse Electric) polarization it gets coupled into the first waveguide. At the same time, red TM (Transverse Magnetic) polarized light passes through and its polarization is converted from TM to TE by the phase retarder which is subsequent to the first waveguide. Hence, red TE light will couple into the second diffraction grating. As long as there are only two-color bands, this system works. However, if there are more than two waveguides and color bands, the embodiment of FIG. 33 shows the architecture aims at providing a solution to this case. All wavelength at the input must be polarized in TM mode. Then the polarization for the light with wavelength $\lambda_1$ only turns to TE mode by the first component after the projection lens while the polarization of the other color bands does not change. The first color band polarized TE couples then into the first waveguide. After the first waveguide, there is another phase retarder that turns only the polarization state of light with wavelength $\lambda_2$ into TE mode while not touching the state of the other wavelengths. And this procedure repeats up to the last color band. However, with such approach, there is an issue. Indeed, there are no wave retarders that can selectively change the polarization state of one wave band and at the same time leave the rest of the spectrum in an unchanged polarization state. Therefore, technique of document U.S. Pat. No. 8,885,997 only works for two color channels.

Hence, there is a need to provide a solution that can be used with more than two color channels. In addition, it would be interesting to obtain a technical solution that does not impose requirements concerning the polarization of the light contrary to the technique of document U.S. Pat. No. 8,885,997.

The proposed technique is an alternative to the technical solution of document U.S. Pat. No. 8,885,997 that does not suffer from these drawbacks.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure is directed to an optical device for delivering a polychromatic image to an eye box being an area positioned in front of an eye of a user wearing said optical device. The optical device is remarkable in that it comprises:

a light-engine for delivering said polychromatic image, said light engine being able to generate n different monochromatic light image beams [$C_1, \ldots, C_i, \ldots, C_n$], whom combination corresponds to said polychromatic image, each monochromatic light image $C_j$ being associated with a wavelength $\lambda_j$, and wherein $\lambda_{i+1} > \lambda_i$ for all the $i \in [1, n]$, and wherein the monochromatic light image beams $C_j$ is in a transverse electric mode if j is odd, and the monochromatic light image beams $C_j$ is in a transverse magnetic mode if j is even;

n-waveguide elements that are stack on each other, n being an integer greater or equal to three, each waveguide element, except the one closer to the eye of a user, comprising a diffraction grating that can deviate only one of said n monochromatic light image in the waveguide element by total internal reflection, a first output that delivers deviated light toward said eye box, and a second output that delivers non-deviated light by a waveguide element to a subsequent waveguide element, wherein said second output comprising an achromatic half-wave plate, and wherein the waveguide element that is closer to the eye of the user comprises also a diffraction grating that can deviate only one of said n monochromatic light image in the waveguide element by total internal reflection, and an output that delivers deviated light toward said eye box, wherein each diffraction grating of said optical device is associated with a different wavelength, and, wherein the arrangement order of said n-waveguide is done according to the wavelength value, from the smallest to the highest, the smallest waveguide element being positioned closer to the light engine, wherein each of said diffraction grating is defined by a sequence of unit cell embedded in a first material with a first refractive index $n_1$, each unit cell being positioned on a substrate with a refractive index $n_4$, wherein each unit cell having a length equal to d, wherein each unit cell comprises a dual material structure having a rectangular cross-section, wherein each unit cell comprises a first part made of a first material with a second refractive index $n_2$, and a second part made of a second material with a third refractive index $n_3$, wherein the cross section of said dual material structure comprises a width W equals to $W_2+W_3$ with $W_2$ being the width of said first part and $W_3$ being the width of said second part, and said first part having a first height $H_2$, and said second part having a second height $H_3$, and wherein the length d of the unit cell is larger than the width W.

This disclosure relates to a technique that uses n number of waveguides one on top of the other, each waveguide is used for a particular color band and the whole system optimized in such a way to:

couple each image relative to each color band into a particular waveguide;
transmit that image in its color band with maximum efficiency to the eye;
avoid the rejection of a color band;
ensure also the best angular efficiency in each color band.

In one embodiment of the disclosure, it is proposed to use, within one or several waveguide elements, the diffraction grating described in the European patent application no 17306763.

In a variant, the optical device is remarkable in that n is equal to three, and wherein a first waveguide element is associated with a blue color, a second waveguide element is associated with a green color, and a third waveguide element is associated with a red color.

In another embodiment of the disclosure, it is proposed to use, within one or several waveguide elements, the diffraction grating described in the European patent application no 18305263. In such embodiment of the disclosure, a waveguide element comprises a structure with a sequence of dual-material structure as depicted in FIGS. 8(a), 8(b), 9(a) and 9(b) of European patent application no 18305263. In another embodiment of the disclosure, the dual-material structure comprises a first part with a single material and a second part with a single and different material. The first part and the second part having different width and height as detailed later.

In a variant, the optical device is remarkable in that said first height $H_2$ and said second height $H_3$ are equal.

In a variant, the optical device is remarkable in that said first width $W_2$ and said second width $W_3$ are equal.

In a variant, the optical device is remarkable in that the waveguide element associated with a blue color has a diffraction grating with the following values: $W_2=80$ nm, $W_3=112$ nm, $H_2=170$ nm, $H_3=130$ nm, $n_2=1.5$, $n_3=2.1$, $n_4=n_3$, $n_1=1.0$ and d=367 nm.

In a variant, the optical device is remarkable that the waveguide element associated with a green color has a diffraction grating with the following values: $W_2=140$ nm, $W_3=140$ nm, $H_2=300$ nm, $H_3=180$ nm, $n_2=1.5$, $n_3=2.1$, $n_4=n_3$, $n_1=1.0$ and d=424 nm.

In a variant, the optical device is remarkable that the waveguide element associated with a red color has a diffraction grating with the following values: $W_2=180$ nm, $W_3=150$ nm, $H_2=360$ nm, $H_3=220$ nm, $n_2=1.5$, $n_3=2.1$, $n_4=n_3$, $n_1=1.0$ and d=500 nm.

In a variant, the optical device is remarkable that the wavelengths of said n different monochromatic light image beams $[C_1, \ldots, C_i, \ldots, C_n]$, fulfill the following property:

$$\lambda_{i+2} > \frac{2n_4}{n_4+1}\lambda_i + \varepsilon$$

with ε being around 10 nm.

BRIEF DESCRIPTION OF THE DRAWINGS

The above and other aspects of the invention will become more apparent by the following detailed description of exemplary embodiments thereof with reference to the attached drawings in which.

DETAILED DESCRIPTION

As mentioned in document WO2018102834, augmented reality and virtual reality devices use waveguide device that comprises input gratings. The present disclosure relates to a technique that can be implemented within input gratings for a polychromatic image input. The role of the input grating according to one embodiment of the disclosure is to take the image coming from the light engine (named Field of view on the figure), and deviate the light beam in such a way to tunnel it into the waveguide (which is a flat glass plate) by TIR.

Figure 1:
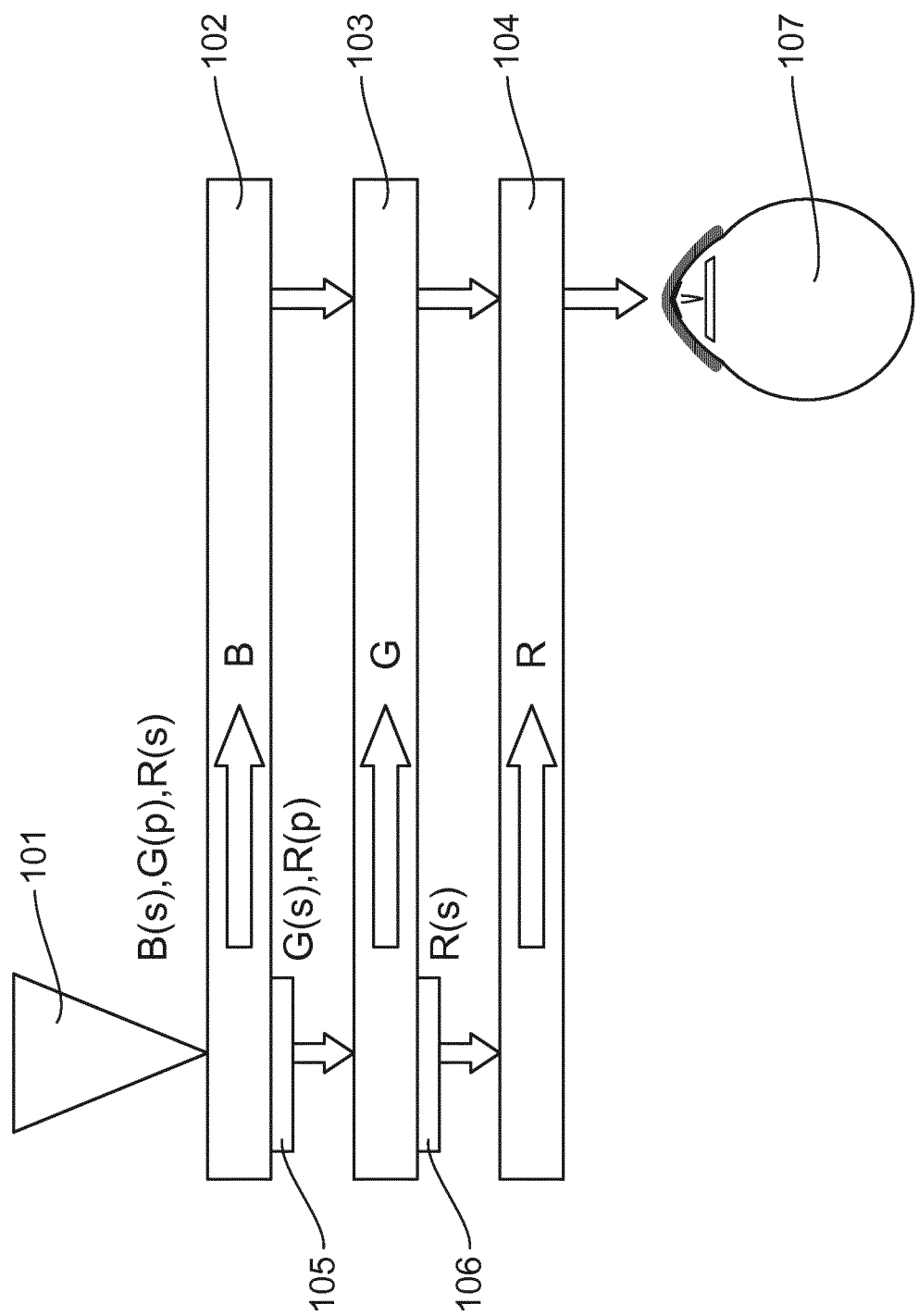
FIG. 1 presents part of an optical device (such as augmented reality glasses) according to one embodiment of the disclosure.

FIG. 1 presents part of an optical device (such as augmented reality glasses) according to one embodiment of the disclosure. Such optical device aims at guiding a polychromatic image represented by light rays or beams referenced 101 generated a light engine.

A first waveguide element referenced 102 receives these light rays or beams 101. The first waveguide element 102 comprises a diffraction grating (not represented) that only deviates blue color component within the light beams 101. The light beams associated with the blue color component are reflected within the first waveguide element 102 in order to reach a first output that delivers the deviated "blue" light toward said eye box of the user referenced 107. The other components of the light beams 101 (i.e. all the other color components, except the blue component color) are transmitted via a second output, referenced 105, of the diffraction grating, without being altered in term of propagation direction (i.e. with the same direction of the light beams 101) to a second waveguide element referenced 103. However, the second output comprises an achromatic half-wave plate for modifying the polarization of the remaining light. In one embodiment of the disclosure a diffraction grating structure, in the first waveguide, comprises the diffraction grating and the second output.

The second waveguide element referenced 103 receives these light rays or beams that do not comprise blue color light component. The second waveguide element 103 comprises a diffraction grating (not represented) that only deviates green color component within the received light beams. The light beams associated with the green color component are reflected within the second waveguide element 103 in order to reach a first output that delivers the deviated "green" light toward said eye box of the user 107. The other components of the light beams 101 (i.e. all the other color components, except the blue and the green component color) are transmitted via a second output, referenced 106, of the diffraction grating, without being altered in term of propagation direction (i.e. with the same direction of the light beams 101) to a third waveguide element referenced 104. In addition, the second output 106 comprises an achromatic half-wave plate for modifying the polarization of the remaining light that is transmitted to another waveguide element.

The third waveguide element referenced 104 receives these light rays or beams that do not comprise blue and green colors light components.

The third waveguide element 104 comprises a diffraction grating (not represented) that only deviates red color component within the received light beams. The light beams associated with the red color component are reflected within the third waveguide element 104 in order to reach a first output that delivers the deviated "red" light toward said eye box of the user 107. Hence, the third waveguide element 104 does not comprise an achromatic half-wave plate.

Figure 2:
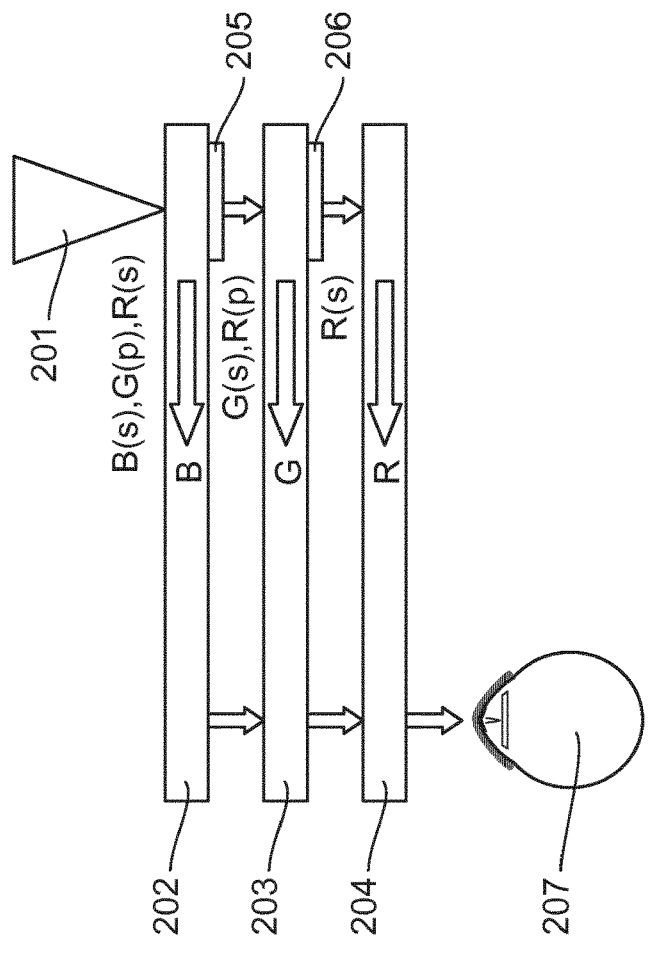
FIG. 2 presents in the left part, a schematic corresponding to the features of FIG. 1 (but without the references), and in the right part, a schematic corresponding to the features of the optical device according to one embodiment of the disclosure, for delivering to the second eye of the user an image.
Figure 2:
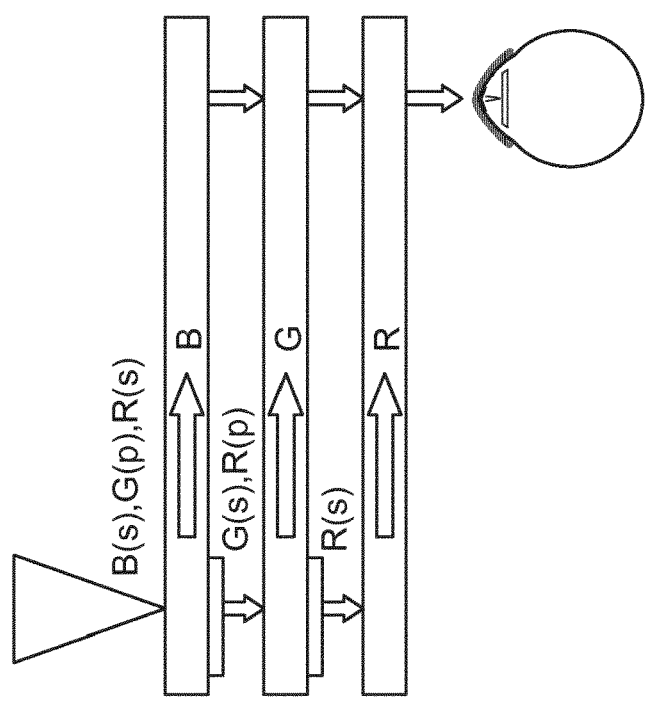

FIG. 2 presents in the left part, a schematic corresponding to the features of FIG. 1 (but without the references), and in the right part, a schematic corresponding to the features of the optical device according to one embodiment of the disclosure, for delivering to the second eye of the user an image.

Such optical device aims at guiding a polychromatic image represented by light rays or beams referenced 201 generated a light engine.

A first waveguide element referenced 202 receives these light rays or beams 201. The first waveguide element 202 comprises a diffraction grating (not represented) that only deviates blue color component within the light beams 201. The light beams associated with the blue color component are reflected within the first waveguide element 202 in order to reach a first output that delivers the deviated "blue" light toward said eye box of the user referenced 207. The other components of the light beams 201 (i.e. all the other color components, except the blue component color) are transmitted via a second output, referenced 205, of the diffraction grating, without being altered in term of propagation direction (i.e. with the same direction of the light beams 201) to a second waveguide element referenced 203. In addition, the second output 205 comprises an achromatic half-wave plate for modifying the polarization of the remaining light that is transmitted to another waveguide element.

The second waveguide element referenced 203 receives these light rays or beams that do not comprise blue color light component. The second waveguide element 203 comprises a diffraction grating (not represented) that only deviates green color component within the received light beams. The light beams associated with the green color component are reflected within the second waveguide element 203 in order to reach a first output that delivers the deviated "green" light toward said eye box of the user 207. The other components of the light beams 201 (i.e. all the other color components, except the blue and the green component color) are transmitted via a second output, referenced 206, of the diffraction grating, without being altered in term of propagation direction (i.e. with the same direction of the light beams 201) to a third waveguide element referenced 204. In addition, the second output 206 comprises an achromatic half-wave plate for modifying the polarization of the remaining light that is transmitted to another waveguide element.

The third waveguide element referenced 204 receives these light rays or beams that do not comprise blue and green colors light components.

The third waveguide element 204 comprises a diffraction grating (not represented) that only deviates red color component within the received light beams. The light beams associated with the red color component are reflected within the third waveguide element 204 in order to reach a first output that delivers the deviated "red" light toward said eye box of the user 207.

The multi-layer waveguide elements of FIG. 1 and in the left part of FIG. 2 comprise 1-order diffraction gratings, whereas the multi-layer waveguide elements of the right part of FIG. 2 comprise −1-order diffraction gratings.

Figure 3A:
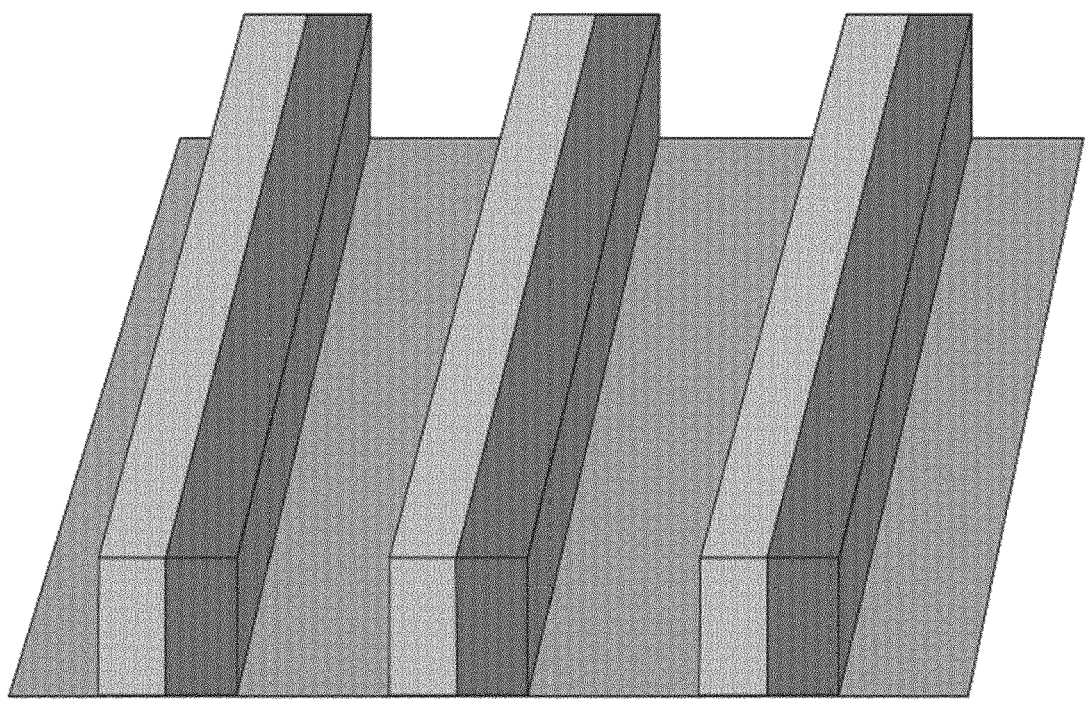
FIG. 3 illustrates an example of a diffraction grating used in a waveguide element according to one embodiment of the disclosure.
Figure 3B:
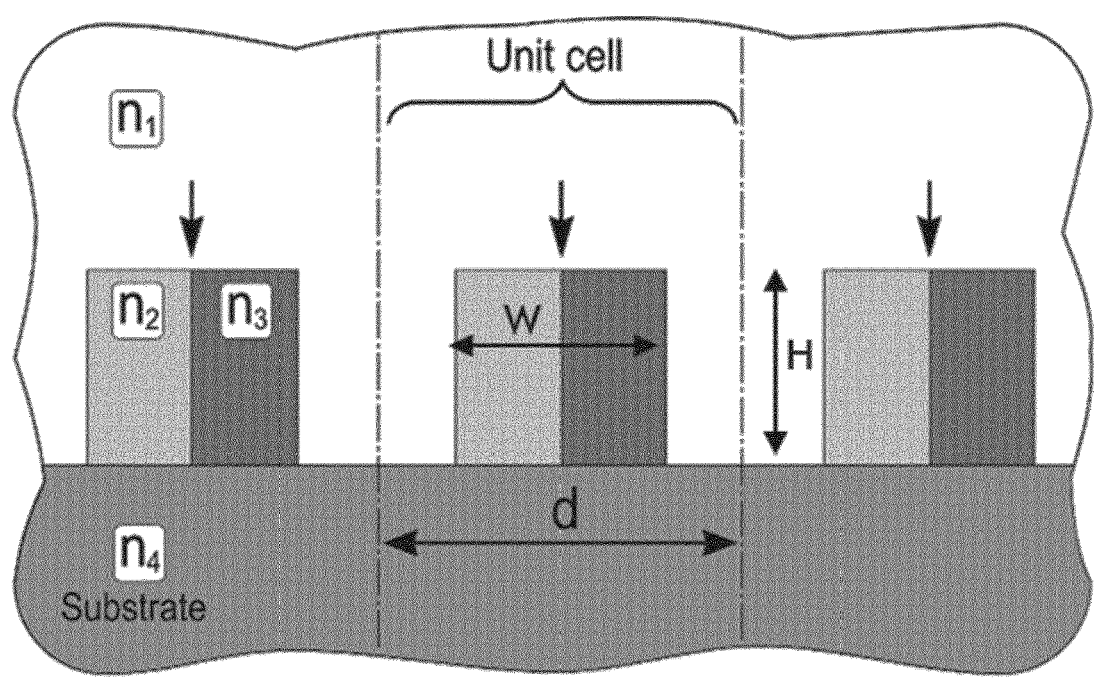

FIG. 3 illustrates an example of a diffraction grating used in a waveguide element according to one embodiment of the disclosure.

Such diffraction grating is also detailed in the European patent application no 18305263.

Figure 4:
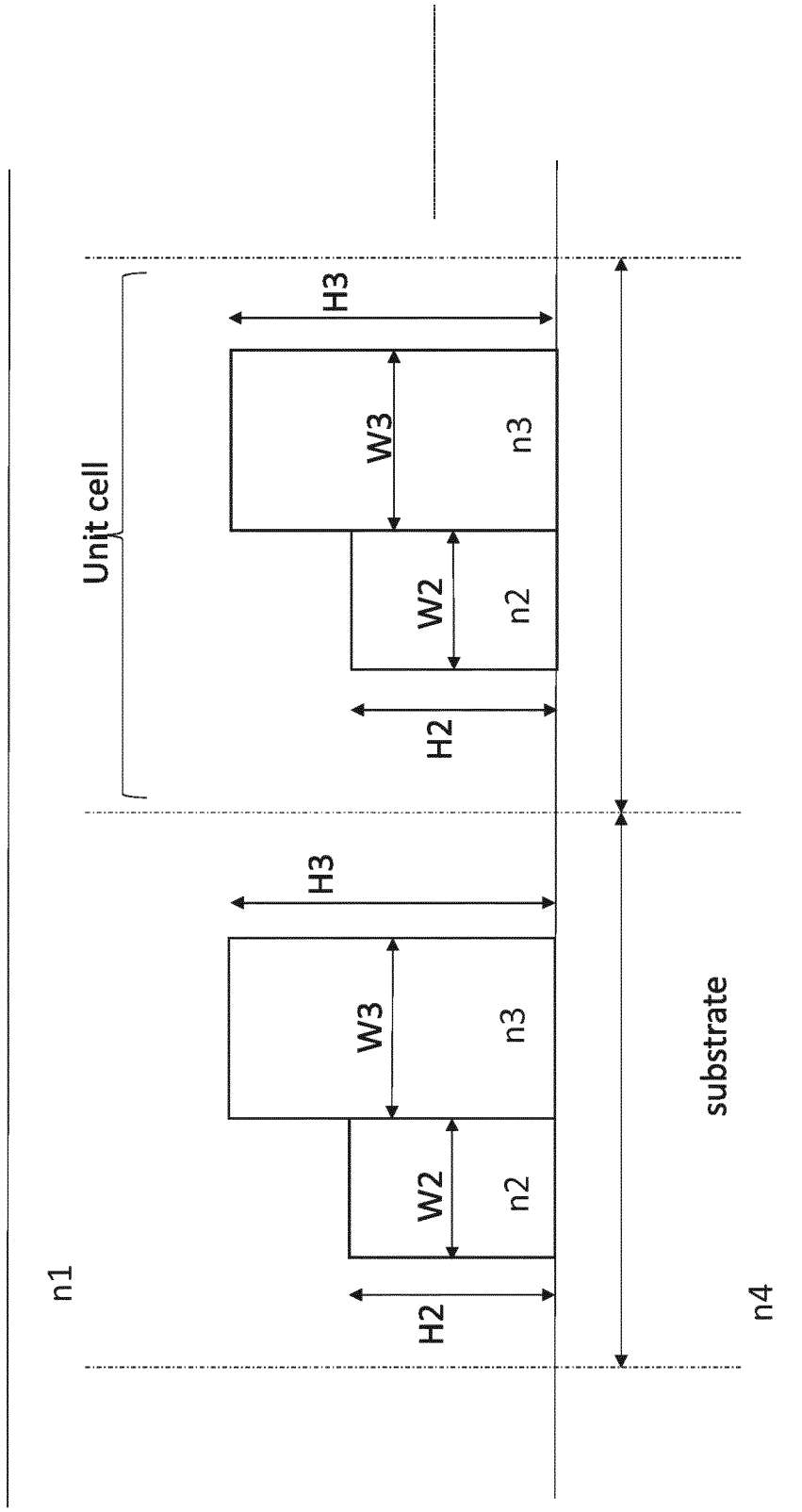
FIG. 4 illustrates an example of a diffraction grating used in a waveguide element according to another embodiment of the disclosure.

FIG. 4 illustrates an example of a diffraction grating used in a waveguide element according to another embodiment of the disclosure.

In such embodiment, the dimensions of the part made of a single material with refractive index $n_2$, and the dimensions of the part made of a single material with refractive index $n_3$ are not the same contrary to the embodiment of FIG. 3.

Figure 5:
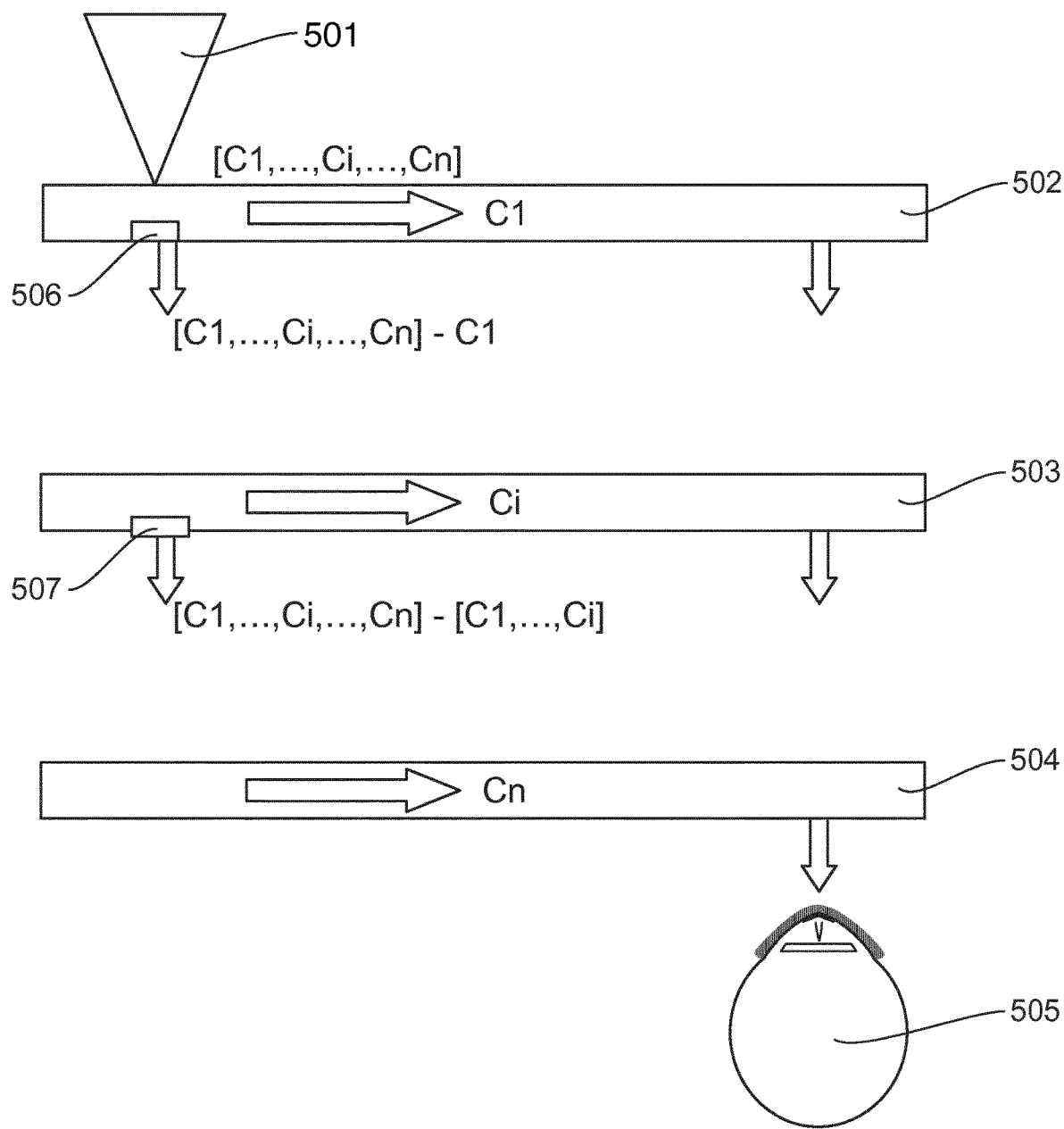
FIG. 5 illustrates a part of an optical device (such as augmented reality glasses) according to another embodiment of the disclosure.

FIG. 5 illustrates a part of an optical device (such as augmented reality glasses) according to another embodiment of the disclosure.

In another embodiment of the disclosure, the light engine used to deliver light beams 101 and 201 can generate light beams with n color components $[C_1, \ldots, C_i, \ldots, C_n]$ referenced 501, each color component $C_j$ being associated with a wavelength $\lambda_j$, and wherein $\lambda_{i+1} > \lambda_i$ for all the $i \in [1, n]$, and wherein the polarization of the color component fulfills the following property: $pol(C_i)=TE$ if $i=2k+1$, and $pol(C_i)=TM$ otherwise.

In addition, the wavelength should satisfy the following property:

$$\lambda_{i+2} > \frac{2n_4}{n_4 + 1}\lambda_i + \varepsilon$$

with ε being around 10 nm.

Hence, in one embodiment of the disclosure, the optical device comprises n waveguide elements (stacked on each other as in the embodiment of FIGS. 1 and 2, with three waveguide elements), and the waveguide element that can deviate only the smallest wavelength, referenced 502, is positioned closer to the light engine. The arrangement of the n waveguide elements follows the order of the n color components $[C_1, \ldots, C_i, \ldots, C_n]$. Therefore, the i-waveguide element referenced 503 can only deviate the color component $C_i$ and transmits the color components $[C_{i+1}, \ldots, C_n]$. The last waveguide element, that is positioned closer to the eye of the user referenced 505, only deviates the color component $C_n$ of the received light beams.

As in the embodiment of FIGS. 1 and 2, the waveguide elements in FIG. 5 comprise a diffraction grating as previously detailed, and also achromatic half-wave plates, as the achromatic half-wave plate referenced 506 and the achromatic half-wave plate referenced 507.

The invention claimed is:

1. An optical device comprising:
    a light engine for delivering a polychromatic image, said light engine being configured to generate at least three monochromatic light image beams corresponding to said polychromatic image, wherein a first and a third one of the monochromatic light image beams has a first polarization state and a second one of the monochromatic light image beams has a second polarization state substantially orthogonal to the first polarization state;
    a first waveguide element having a first diffractive in-coupler configured to couple the first monochromatic light image beam;
    a second waveguide element having a second diffractive in-coupler configured to couple the second monochromatic light image beam;
    a third waveguide element having a third diffractive in-coupler configured to couple the third monochromatic light image beam, wherein the second diffractive in-coupler is between the first diffractive in-coupler and the third diffractive in-coupler;
    a first half-wave plate between the first diffractive in-coupler and the second diffractive in-coupler; and
    a second half-wave plate between the second diffractive in-coupler and the third diffractive in-coupler, wherein the first and second half-wave plates are achromatic half-wave plates.

2. The optical device of claim 1, wherein the first waveguide element is the nearest waveguide element to the light engine, and wherein the first diffractive in-coupler is configured to couple blue light, the second diffractive in-coupler is configured to couple green light, and the third diffractive in-coupler is configured to couple red light.

3. The optical device of claim 1, wherein each of the diffractive in-couplers is defined by a sequence of unit cells, wherein each unit cell comprises a dual-material structure having a first part made of a first material and a second part made of a second material, the first and second parts having different refractive indices.

4. The optical device of claim 3, wherein the dual-material structure has a substantially rectangular cross section.

5. The optical device of claim 3, wherein the first part has a first height and the second part has a second height substantially equal to the first height.

6. The optical device of claim 3, wherein the first part has a first width and the second part has a second width substantially equal to the first width.

7. The optical device of claim 1, wherein the first diffractive in-coupler is configured to couple blue light and has a grating pitch of 367 nm.

8. The optical device of claim 1, wherein the second diffractive in-coupler is configured to couple green light and has a grating pitch of 424 nm.

9. The optical device of claim 1, wherein the third diffractive in-coupler is configured to couple green light and has a grating pitch of 500 nm.

10. An optical method comprising:
    generating a polychromatic image including a first, second, and third monochromatic image, the first and third images having a first polarization state and the second image having a second polarization state;
    coupling the first image, with the first polarization state, into a first waveguide;
    using a first half-wave plate, modifying the second image from the second to the first polarization state and modifying the third image from the first to the second polarization state;
    coupling the second image, with the first polarization state, into a second waveguide;
    using a second half-wave plate, modifying the polarization state of the third image from the second polarization state to the first polarization state, wherein the first half-wave plate and the second half-wave plate are achromatic half-wave plates; and
    coupling the third monochromatic image, with the first polarization state, into a third waveguide.

11. The method of claim 10, wherein the first image is a blue image, the second image is a green image, and the third image is a red image.

12. The method of claim 10, wherein the first polarization state is a transverse electric polarization and the second polarization state is a transverse magnetic polarization.

13. The method of claim 10, wherein the coupling of the first image, the second image, and the third image are performed by respective diffractive in-couplers defined by a sequence of unit cells, wherein each unit cell comprises a dual-material structure having a first part made of a first material and a second part made of a second material, the first and second parts having different refractive indices.

14. The method of claim 13, wherein the dual-material structure has a substantially rectangular cross section.

15. An optical method comprising:
    providing a light engine;
    providing a stack of waveguide elements having respective in-couplers configured to couple light from the light engine, the stack comprising at least a first, a second, and a third waveguide element;
    providing at least two half-wave plates, arranged such that none of the half-wave plates are between the light engine and the first waveguide element, one of the half-wave plates is between the light engine and the second waveguide element, and two of the half-wave plates are between the light engine and the third waveguide element, wherein at least one of the half-wave plates is an achromatic half-wave plate; and directing, from the light engine onto the stack of waveguide elements, a polychromatic image including a first, second, and third monochromatic image, the first and third images having a first polarization state and the second image having a second polarization state substantially orthogonal to the first polarization state.

16. The optical method of claim 15, wherein the in-coupler of the first waveguide element is configured to couple blue light, the in-coupler of the second waveguide element is configured to couple green light, and the in-coupler of the third waveguide element is configured to couple red light.

17. The optical method of claim 15, wherein the stack of waveguide elements further comprises a fourth waveguide, and wherein three of the half-wave plates are between the light engine and the fourth waveguide element.

\* \* \* \* \*